United States Patent [19]

Yaplee et al.

[11] 3,774,207
[45] Nov. 20, 1973

[54] NADIR SEEKER ORIENTATION OF A SPACE VEHICLE IN RELATION TO THE PLANET BEING ORBITED

[75] Inventors: Benjamin S. Yaplee, Hyattsville, Md.; Allan Shapiro, Alexandria, Va.

[73] Assignee: The United States of America as represented by the Secretary of the Navy, Washington, D.C.

[22] Filed: Apr. 25, 1972

[21] Appl. No.: 247,306

[52] U.S. Cl............ 343/7.4, 343/7 ED, 343/100 ST
[51] Int. Cl............................................. G01s 9/06
[58] Field of Search...................... 343/7.4, 100 ST, 343/7 ED, 8, 9

[56] References Cited
UNITED STATES PATENTS

| | | | |
|---|---|---|---|
| 3,670,334 | 6/1972 | Gaheen, Jr. | 343/7.4 |
| 3,184,736 | 5/1965 | Badewitz | 343/7 ED |
| 3,362,024 | 1/1968 | Badewitz | 343/7 ED |
| 3,133,283 | 5/1964 | Ghose | 343/100 ST |
| 3,088,697 | 5/1963 | Cutler | 343/100 ST |

*Primary Examiner*—Benjamin A. Borchelt
*Assistant Examiner*—G. E. Montone
*Attorney*—R. S. Sciascia et al.

[57] ABSTRACT

A space vehicle orientation system, for sensing the space vehicles orientation relative to the Z axis or vertical axis in the nadir direction, which uses a pulsed doppler radar to trace the nadir. The antenna of the radar is directed at the plantes surface. Operating in the beam limited condition, a coherent pulse is transmitted and when the center of the beam is pointed exactly at nadir the illuminated patch on the earth is essentially circular or symmetrically illuminated and the returned signal is symmetrical in doppler frequency shift and in pulse shape. Any deviation from the nadir will result in a change in either or both the doppler shift or the pulse width. By sensing these changes the radar beam may be redirected toward the spot directly below the space vehicle, the nadir.

3 Claims, 6 Drawing Figures

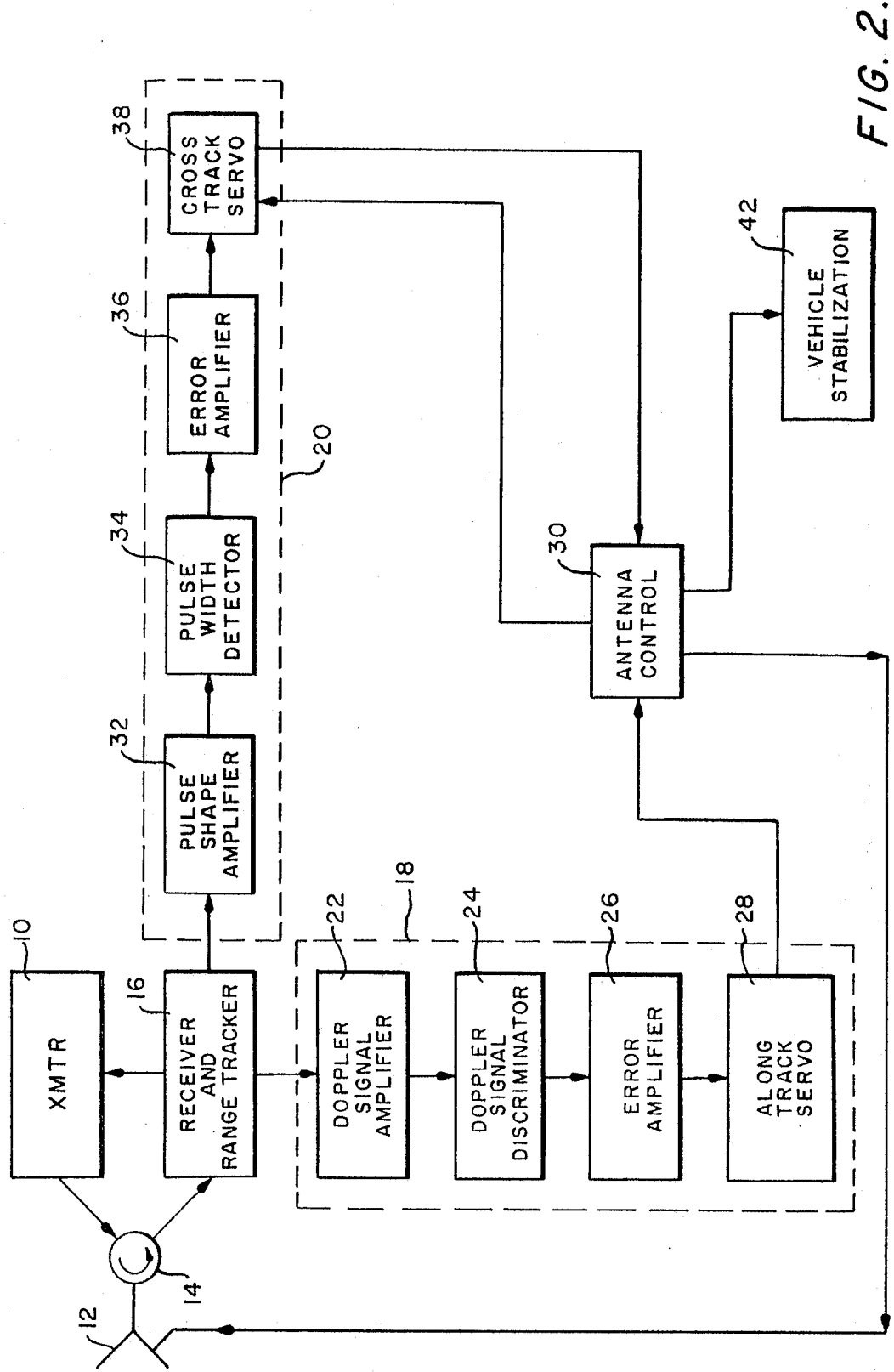

NADIR SEEKER ORIENTATION OF A SPACE VEHICLE IN RELATION TO THE PLANET BEING ORBITED

BACKGROUND OF THE INVENTION

The orientation of a space vehicle can be achieved in several ways. Such methods as star seekers, sun seekers, horizon sensors, inertial platforms, gravity gradient stabilizers, or combinations thereof have been employed to sense the orientation of the spacecraft. These systems suffer from the fact that the error in orientation detected by the appropriate sensor controls the mechanism for nulling the error detected. The disadvantage of the sensors described is that their inherent accuracies needed are approximately 1° RMS off nadir. The accuracies needed for future satellite systems require accuracies of 0.1° off nadir or better. Ordinary radar tracking systems are designed to track point targets while the target in question is a point on a surface for larger than the beam width of the system radar. Thus it is seen that an ordinary tracking radar could not track a point on the surface of an extended target.

SUMMARY OF THE INVENTION

The present invention in attempting to orientate space vehicles employs the point directly below the vehicle on the planets surface as a reference point. This point is the nadir. When a pulsed doppler radar is directed at the nadir, the planet's surface is approximately perpendicular to the beam thus the surface will be symmetrically illuminated. Any deviation from the nadir ahead or behind the satellite track will cause a doppler shift in frequency indicative of the direction and amount off the nadir. This shift is sensed and causes the antenna servos to correct the antenna position until the antenna is redirected toward the nadir. Further should the beam move off track either to the right or left of the nadir the pulse width will increase as the area of illumination has increased due to the movement off the perpendicular by the beam. Thus the antenna orientation may be sensed in the cross track direction and correction made therefore in the antenna cross track servos. Thus it is seen that using the above described techniques as a space vehicle orbits a planet, say in a polar orbit, the vehicles antenna will at all times be directed at the planets surface and will be tracking the nadir, directly below the vehicle. Thus the vehicle is given a point of reference to use for stabilization and orientation of the vehicle. The advantage most apparent is that this method is more sensitive by at least an order of magnitude than the prior art methods described above.

STATEMENT OF THE OBJECTS

It is, therefore, an object of the invention to provide an improved space vehicle stabilization system.

Another object is the provision of a tracking radar used to track the nadir position on a planets surface and thereby provide a reference point.

Yet another object of the present invention is the use of the tracking radar in the beam limited condition to derive on track signals from the doppler return and cross track signals from the variation in pulse width.

BRIEF DESCRIPTION OF THE DRAWINGS

FIG. 2 is an illustration of the preferred embodiment.

DESCRIPTION OF THE PREFERRED EMBODIMENT

Figure 1:
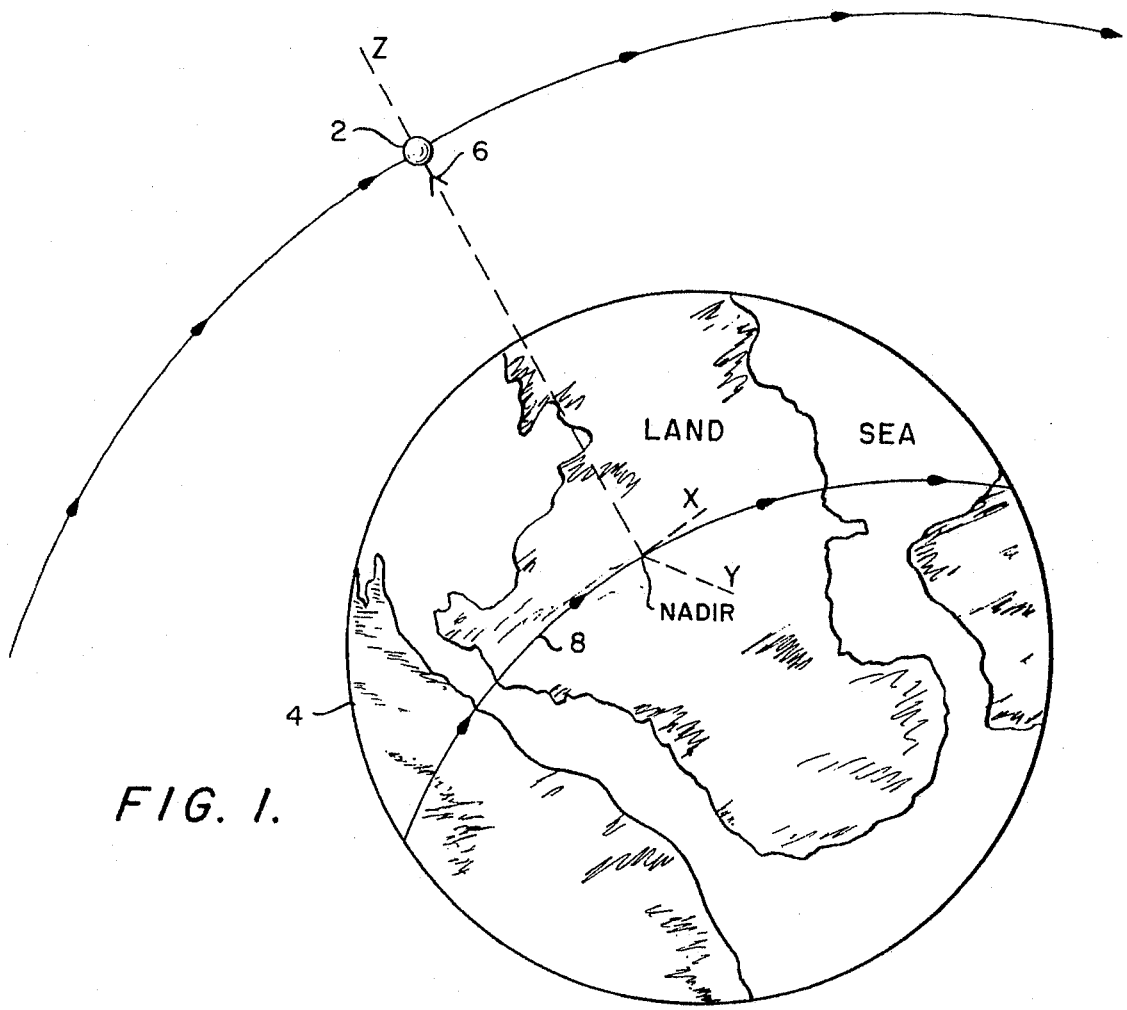
FIG. 1 is an illustration of a space vehicle in orbit with the radar tracking the nadir.

Referring to the preferred embodiment, FIG. 1 shows a satellite 2 orbiting a planet 4. The satellite antenna 6 is oriented vertically in the Z axis and is pointed at its nadir, the point directly below the antenna on the planet surface. As the satellite orbits the planet a plot of the nadirs would form track 8 on the planets surface. The satellite is oriented with X and Y axis as shown. These would correspond to the along track axis and cross track axis respectively. Thus if the satellite can track the nadir it is constantly correcting the Z axis with respect to the nadir.

Referring to FIG. 2, a pulsed doppler transmitter 10 is connected to antenna 12 through transmit receive device 14. Antenna 12 may be a standard horn or a phased array. Return signals are received and range tracked in the receiver 16 where the doppler and pulse returns are separated and fed to the along track channel 18 and cross track channel 20 respectively. The antenna beam width and pulse width for a circular symmetrical beam should be matched for optimum sensitivity to angle deviation from the nadir.

Utilizing a width pulse in the second mode of radar operation, the deviations from nadir can be obtained with angular resolution of tenths of a degree by measuring the change in doppler shift and the widening of the pulse of the radar return.

Assume that the antenna points either ahead or behind the nadir along the track of the orbit. In this case the centroid of the doppler spectrum will be shifted by an amount that is directly proportional to the angular displacement. The doppler spectrum centroid can be expressed as $$f_d = 2v\theta/\lambda,$$

where $v$ is the orbital velocity of the satellite, $\theta$ is the angular deviation from the normal, and $\lambda$ is the radar wavelength. For an antenna pointing at nadir the central doppler shift is zero, since $\theta = 0$. If the angle changes by a small amount, the change in doppler is $$df_d = 2v/\lambda \, d\theta,$$

or the angular deviation is $$d\theta = \lambda/2v \, df_d,$$

For $\lambda = 4$ cm and $v = 10^3$ m/s (for the assumed orbit)

$$d\theta \approx 3 \times 10^{-6} \, df_d.$$

For a shift in the doppler of $10^3$ radians $\approx 11$ min or arc, which indicates that the doppler shift is quite sensitive to angular deviations. The sign of the doppler shift would indicate the direction along the track of the satellite in which the antenna is pointing. Similarly, the variation of the pulse width can be employed to indicate angular deviations — but with a 360° ambiguity. Assume a beamwidth-limited condition where the transmitted pulse width is matched to the antenna beamwidth; thus $$\theta = \sqrt{c\tau/h} = \Omega_A/2$$

where $\Omega_A$ is the antenna beamwidth, $c$ is the speed of light and $h$ is the height of the satellite. Then the pulse width is given by $$\tau = h\,(\Omega_A/2)^2\,1/c.$$

For $h = 10^6$ m, and $\Omega_A = 0.05$ $$\tau = 10^6 \times 25 \times 10^{-4}/4 \times 3 \times 10^8 = 2 \times 10^{-6} \text{ sec}.$$

The pulse width $\tau$ as a function of $\theta$, where $\theta < \Omega_A/2$, is obtained from the relation $\theta = \sqrt{c\tau/h}$, which yields $\tau = h\theta^2/c$. Then, for $\theta = \Omega_A/2$ $$d\tau = 2\,h\theta/c\,d\theta = 5/3 \times 10^{-4}\,d\theta.$$

For $d\theta = 3 \times 10^{-3}$ as before, $d\tau = 500$ nsec. Thus variations in $\tau$ can indicate the deviation of antenna pointing to within 6 min of arc if frequency and pulse width can be measured to within 1 kHz and 500 nsec, respectively.

Figure 3B:
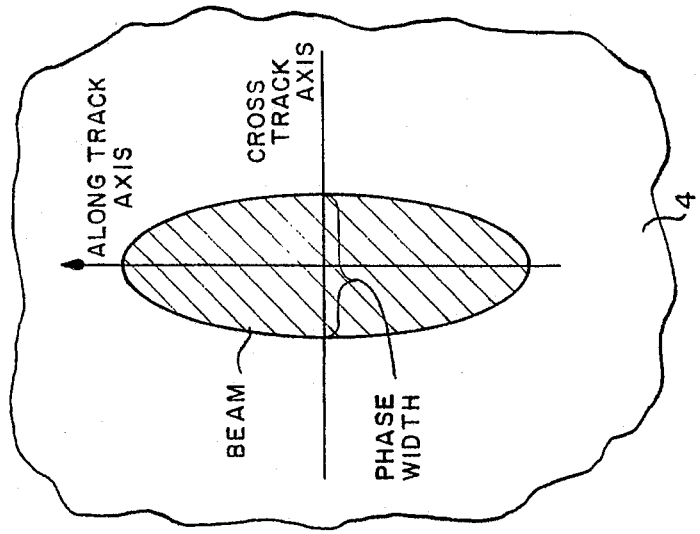
FIGS. 3A and 3B show the use of circular and elliptical beam illumination.
Figure 3A:
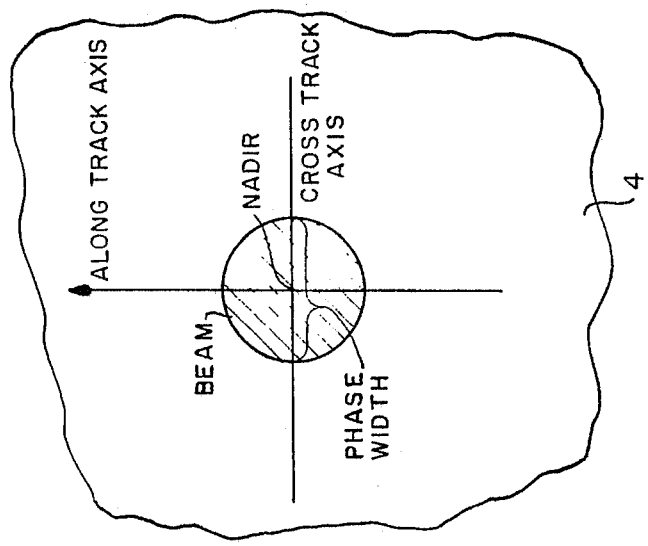

Thus it is seen that the deviation in pulse width may be used track the minimum duration which is the nadir. FIG. 3A shows a circular beam symmetrically illuminating the nadir. As pointed out above the deviation for a circular beam is the same whether the antenna is off along the track or off on cross track as the beam width is matched to the transmitted pulse width. It may be desirable to cause the pulse deviation to be minimal in the along track axis, as the doppler frequency shift will detect whether the antenna is pointed ahead or behind the nadir; and the along track channel will correct the antenna position. Thus by employing the above mentioned relationship between beam width $\Omega_A$ and pulse width $\tau$ it is seen by employing an elliptical beam, note FIG. 3B, with its short axis matched to the pulse width on the cross track and the long axis which greater than the pulse width by several times aligned along the along track axis. The pulse width deviation remains at the optimum along the cross track axis and is greatly reduced on the long track axis. Thus the pulse width may be used to track the error on the cross track axis without effect on the long track axis and the doppler shift may be used to track the along track axis.

Looking now to the along track channel 18, the doppler signal is fed from receiver 16 through doppler signal amplifier 22 to the doppler signal discriminator 24. The doppler shift detected in discriminator 24 is fed through error voltage amplifier 26 to the along track servo 28 which drives the antenna control 30 which is connected to the antenna. While a horn and mechanical servo control is shown the system could employ a phased array and electronic control.

Similarly in the cross track channel 20, the returned pulse width is fed from receiver 16 through pulse amplifier 32 to pulse width detector 34 which gives an output proportional to return signal pulse width. This output is connected through the error amplifier 36 to the cross track servo 38 and then to the antenna control 30.

As mentioned above the pulse width is of a minimum when pointed directly at the nadir. Thus when the antenna points in any direction away from the nadir the pulse width will increase. As the elliptical beam is used to express pulse width deviation in the along track direction, we will consider only the cross track ambiguity. That is for any amount off to the right or equally to the left of the nadir the same error will be sensed. One method of determining which direction the antenna should move to correct the error is one of trial and error. First a direction of movement is assumed to be correct (say to the left) and then correction in that direction is attempted. Should the pulse width continue to increase the cross track servo is reversed and the antenna would drive to the right back to the nadir where the pulse width reaches a minimum. At this point the antenna will still be driven as the pulse width detector indicates that the pulse width is not zero thus the antenna would drive on past the nadir increasing the pulse width. At this point the servo 36 would again reverse driving back toward the nadir and similarly beyond. It is obvious that the antenna then hunts back and forth along the cross track axis tracking the nadir.

Figure 5:
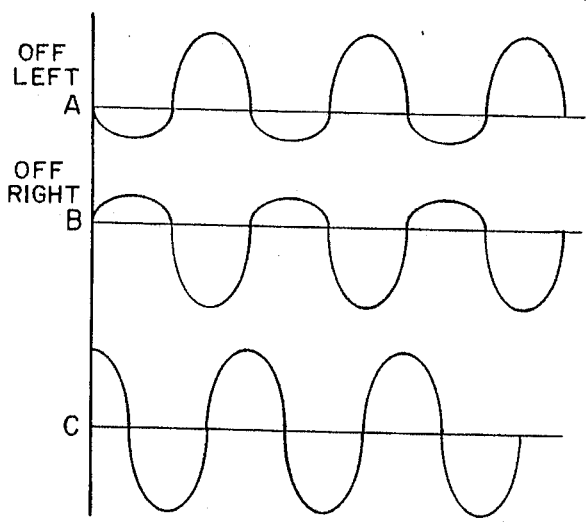
FIGS. 5A, B and C illustrate the use of the dither and error output as servo control voltages.
Figure 4:
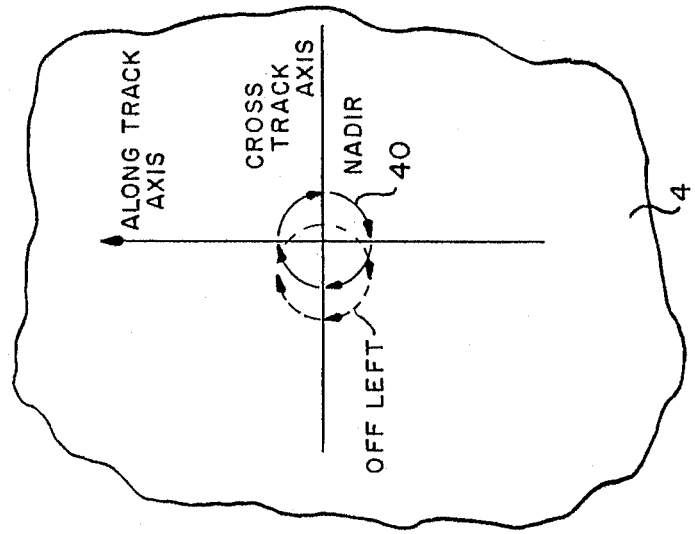
FIG. 4 illustrates the use of antenna dither.

A second and preferred method of resolving the ambiguity is to dither the antenna in a circular pattern about the nadir, note FIG. 4, circle 40 is a track of the centroid of the antenna beam. Thus when the antenna is circling the nadir the pulse width variation would be very small but when the antenna went off track to the say to the left side the pulse width in that side would increase. Accordingly the pulse width in the right side would decrease as it is passing closer to the nadir. A similar effect occurs but with opposite phase when the antenna is off to the right side. Thus a sinusoidal signal of one phase is developed when the antenna is off left while a second sinusoidal signal is developed of the opposite phse when the antenna is off left. Therefore by taking the signal developed by the antenna dither motor (not shown) and coupling this to a two phase cross track servo motor as one winding power source, note FIG. 5C. And the remaining winding power being supplied error voltage from the error amplifier 34. Noting FIGS. 5A and B is seen that there is a 180° phase shift between the two and the FIG. 5C shows a 90° difference between 5A and 5B. Thus a two phase motor will drive in one direction for a left error signal and in the other for the right error signal. Further when the antenna is right on the nadir the error output is approximately a zero A/C output.

The antenna control 30 supplies angle information to the vehicle stabilization system 42 which reorients the vehicle.

Fast changes in the surface are compensated for by a range tracker, which follows rapid changes in the planets surface such as mountain ranges. Such a range tracker is incorporated in the receiver in a standard manner.

Initially to orient the vehicle the antenna would be manually directed to the nadir or it could be scanned until the nadir was located and then the system would track the nadir.

Of course this system need not track the nadir constantly but periodically thus the radar could be used for other functions such as surface profiling.

Therefore the invention is to orient space vehicles employing the point directly below the vehicle on the planets surface as a reference point. This point is the nadir. When a pulsed doppler radar is directed at the nadir, the planet's surface is approximately perpendicular to the beam thus the surface will be symmetrically illuminated. Any deviation from the nadir ahead or behind the satellite track will cause a doppler shift in frequency indicative of the direction and amount off the nadir. This shift is sensed and causes the antenna servos to correct the antenna position until the antenna is redirected toward the nadir. Further should the beam move off track either to the right or left of the nadir the pulse width will increase as the area of illumination has increased due to the movement off the perpendicular by the beam. Thus the antenna orientation may be sensed in the cross track direction and correction made therefore in the antenna cross track servos. Thus it is seen that, using the above described technique, as a space vehicle orbits a planet, say in a polar orbit, the vehicles antenna will at all times be directed at the planets surface and will be tracking the nadir, directly below the vehicle. Thus the vehicle is given a point of reference to use for stabilization and orientation of the vehicle. The advantage most apparent is that this method is more sensitive by at least an order or magnitude than the prior art methods described above.

Obviously many modifications and variations of the present invention are possible in the light of the above teachings. It is therefore to be understood, that within the scope of the appended claims, the invention may be practiced otherwise than as specifically described.

We claim:

1. A system for use in space vehicle orientation which comprises:
   a radar system which is installed in an orbiting satellite, said radar system comprising:
   transmitter means for transmitting coherent signal pulses;
   antenna means for directing said coherent signal pulses in a signal transmitted beam and gathering return coherent signal pulses from a reflected single beam;
   means to control said antenna means to track a point on the surface of a celestial body;
   receiver means coupled to said antenna means for receiving said return;
   said receiver having at least a first and second output;
   said first output being indicative of the antenna error in the direction of travel of said satellite;
   said second output being indicative of the antenna error in the cross travel direction perpendicular to the direction of travel of said satellite;
   whereby said antenna means employs said first and second outputs to track said point on the surface of said celestial body.

2. The system described in claim 1 wherein said point on said surface is the nadir of the space vehicle.

3. The system described in claim 1 wherein said first output is represented by the doppler shift in said coherent signal pulses;
   detecting means coupled to said first output for detecting said doppler shift and for controlling said antenna in said direction of travel;
   and said second output is represented by the reflected pulse width of said coherent signal pulses;
   pulse width detector means coupled to said second output for detecting the size of said pulse width;
   said antanna means being controlled in said cross travel direction by the detected pulse width from said pulse width detector;
   thereby said antenna means is controlled by said doppler shift and said detected pulse width to track said point on the surface of said celestial body.

* * * * *